March 23, 1965     B. LONG     3,174,839
METHOD AND APPARATUS FOR HEAT TREATMENT OF GLASS
Filed July 12, 1961     6 Sheets-Sheet 1

INVENTOR.
Bernard Long.
BY
Harness, Dickey & Pierce
ATTORNEYS.

March 23, 1965   B. LONG   3,174,839
METHOD AND APPARATUS FOR HEAT TREATMENT OF GLASS
Filed July 12, 1961   6 Sheets-Sheet 3

INVENTOR.
Bernard Long.
BY
Harness, Dickey & Pierce
ATTORNEYS.

March 23, 1965     B. LONG     3,174,839
METHOD AND APPARATUS FOR HEAT TREATMENT OF GLASS
Filed July 12, 1961     6 Sheets-Sheet 6

FIG. 18.

INVENTOR.
Bernard Long.
BY
Harness, Dickey & Pierce
ATTORNEYS.

United States Patent Office 3,174,839
Patented Mar. 23, 1965

3,174,839
METHOD AND APPARATUS FOR HEAT TREATMENT OF GLASS
Bernard Long, Paris, France, assignor to Glaces de Boussois, S.A., Paris, France, a corporation of France
Filed July 12, 1961, Ser. No. 123,471
Claims priority, application France, July 15, 1960, 832,994, Patent 1,271,096
9 Claims. (Cl. 65—114)

The present invention relates primarily to the tempering or heat treatment of glass, and more specifically relates to improved apparatus and equipment therefor, and to an improved method or process.

The novel method and apparatus herein described and claimed is not only useful in the heat treatment of plate glass, but also in the heat treatment of so-called fire-polished sheets of glass.

Plate glass refers to flat sheets of glass having plane, parallel polished surfaces which are obtained by mechanically grinding and polishing unground roughly finished sheets. So-called fire-polished sheets may be obtained directly by flotation, pouring or drawing of liquid glass, and in many instances, the sheets thus produced may have a surface finish and surface flatness which make them suitable for treatment by the improved process and appratus of the present invention.

Generally speaking, the type of heat treatment to which the present invention relates consists in heating the glass sheet to a predetermined degree of softness and then rapidly and simultaneously cooling opposite faces of the sheet. Inasmuch as the sheet must be heated to a softened condition, it is generally desirable to effect both the heating and the cooling of the sheet with the sheet arranged in a vertical position in order that the flatness of the sheet will be maintained. As is well-known, glass sheets heat treated in this manner result in a product having extremely high mechanical strength and in addition have other remarkable properties; for example, such sheets when broken become divided into a multiple of fragments having noncutting edges and said fragments generally have a relatively small unit size. These desired characteristics of the final product have been found to depend, to a large degree, on the rapidity and the uniformity with which the opposed faces of the heated glass sheet are cooled.

Heretofore it has been customary to produce heat treated glass sheets by first heating the sheet to the desired degree of softness while the sheet is suspended in a vertical position. The vertically arranged heated glass sheet is then suspended between a pair of platens or manifolds which simultaneously discharge cooling fluid, usually air, against opposite faces of the heated glass sheet in order to chill it rapidly and more or less uniformly. In conventional practice, this cooling fluid is ejected through nozzles, apertures or slots in the platens or manifolds which are disposed adjacent to and substantially co-extensive with the faces of the glass sheet, and it has been conventional to subject the manifolds or platens to a reciprocatory oscillating or translatory movement in order to distribute the cooling fluid more uniformly over the surface of the heated sheet.

Sheets produced in this way superficially appear optically satisfactory, but when examined by a practiced eye or under partilly polarized light, it is found that many surface imperfection exist. These imperfections may take the form of a "pattern" in the glass surface which usually results from the movement of the cooling manifolds. The glass surface may also have what are called "iridescences" or double refraction patches. It has been found that virtually all of these surface imperfections are directly attributable to the lack of uniformity of the cooling of the surface of the heated glass sheet, or more properly, the lack of uniformity in the rate of cooling of the various portions of the surface relative to each other. It is clear that the lack of precise uniformity of cooling action is inherent in any cooling procedure where fluid is ejected through nozzles, jets, slots or similar apertures.

It is a primary object of the present invention to provide a method and apparatus which inherently will greatly increase the uniformity of the cooling action on the surface of the heated glass sheet, and, at the same time, to provide a process and apparatus in which the rate of cooling of the glass sheet may be accelerated to virtually any desired degree, and it has been found that the attainment of these objectives results in the production of a final product having an extremely fine and uniform surface quality and a freedom from the imperfections referred to above which inherently result from a practice of the processes conventionally used at the present time.

In its broader sense, the present invention contemplates the simultaneous cooling of opposite surfaces of a heated glass by locating closely adjacent these surfaces heat absorbing platens having plane surfaces at least co-extensive with the surfaces of the glass sheet to be treated. These platens have a mass sufficient to absorb the heat from the adjacent glass surfaces.

It has been found that it is of extreme importance that these heat absorbing platens be located in exeremely close proximity to and with their surfaces spaced uniformly from the adjacent surfaces of the heated glass sheet. The importance of the precision of the location and spacing of these cooling plates must be strongly emphasized, yet at the same time, it is extremely desirable to minimize any physical contact between these cooling platens and the heated glass sheet. It has been found that if suitable heat absorbing plates or platens are located with their plane surfaces spaced a distance of one millimeter (0.03937 inch) or more from the surfaces of the heated glass sheet, the rate of cooling of the sheet will be much the same as if the heated glass sheet were merely allowed to be cooled by the surrounding air. In other words, under these circumstances, the cooling plates have little or no important cooling function other than perhaps to limit control irregularities which might result from convection currents.

It has been found, however, that when the space between the surfaces of the cooling plates and the adjacent surfaces of the heated glass sheet is reduced below one millimeter, the cooling function of the plates becomes appreciable. As the air layer between the surface of the glass sheet and the surface of the adjacent cooling plate is reduced the cooling effect of the plate increases materially and progressively and it has been found that the cooling effect increases very rapidly as the thickness of this air layer is reduced below 0.6 millimeter (.024 inch).

It has further been found that this cooling effect increases very rapidly indeed when the air layer above-described is reduced below 0.30 millimeter (.012 inch). When the cooling plate is further moved into even closer proximity to the surface of the glass sheet, thereby reducing the air layer to 0.15 millimeter or .006 inch, the cooling rate or heat loss of the glass sheet is extremely rapid. It has been found that a heated glass sheet having a thickness of 5.5 millimeters (0.22 inch) when cooled in this manner is chilled so rapidly that in the zone where the glass is plastic, it is found to be highly tempered after returning the glass to the surrounding room temperature.

When the air layer above-referred to is further reduced to 0.10 millimeter, or .004 inch, the tempering of the sheets becomes so great and so rapid that they have distinctly superior physical and surface characteristics to sheets produced by conventional processes and apparatus heretofore known. For example, the surfaces are uniform, free from the conventional surface imperfections described above, and when broken the sheet becomes divided into much smaller fragments than would be the case with similar sheets produced by conventional known heat treating processes.

The cooling plates above-referred to may be formed of any suitable material having adequate heat absorbing or heat diffusing characteristics. Suitable metals for this purpose are mild steel, nonoxidizing or so-called stainless steels, brass, aluminum, copper or similar metallic alloys. Success has also been obtained by using other and different materials, such, for example, as graphite and silicon carbide. These latter materials have certain advantages over the above-described metals in that, generally speaking, they have a much lower coefficient of expansion and are, therefore, less susceptible to undesirable deformation during use.

The thickness of the plates must obviously be sufficient to provide the mass necessary to absorb the heat which must be removed from the heated glass sheet in order to cool the sheet with the desired degree of rapidity and it is obvious that the thickness of these plates must, therefore, depend to some extent, on the heat absorbing characteristics of the material from which the plates are formed as well as upon the thickness of the glass sheets being cooled. For cooling glass sheets of more or less conventional thickness, the cooling plates may vary in thickness from roughly one-half inch to a thickness of one and one-half inches, and it may be said generally, that the cooling plates should have a thickness between three and seven times the thickness of the glass sheet to be cooled.

The maintenance of such a small air layer between the surface of the glass sheet being cooled and the surfaces of the cooling plates requires extreme precision in the manipulation and handling of these cooling plates because, as pointed out above, it is not only very important that the air layer between the surfaces be extremely thin, but it is clear from the above given examples, that it is also important that this air layer be as nearly uniform in thickness as is possible under the circumstances.

For the above reasons, it is also obvious that the glass sheet being treated must have surfaces which are extremely flat, uniform and parallel and to achieve these results extreme care must be exercised to make sure that the glass sheet does not become distorted during the heating and handling thereof.

In order to achieve these results it is necessary to provide means for supporting the vertically arranged sheet in such a manner that none of the supporting apparatus will mechanically interfere with the extremely close approach of the cooling plates to the entire surfaces of the sheet under treatment. At the same time, it is necessary to provide for spacing means to prevent physical contact of the cooling plates with the heated surfaces of the glass sheet. The mounting and handling of the heated glass sheet and the manner of spacing the surfaces of the cooling plates therefrom with the degree of precision required for the practice of the present invention may be achieved in various ways, several of which are illustrated in the accompanying drawings.

Figures 1, 2, 3, 4:
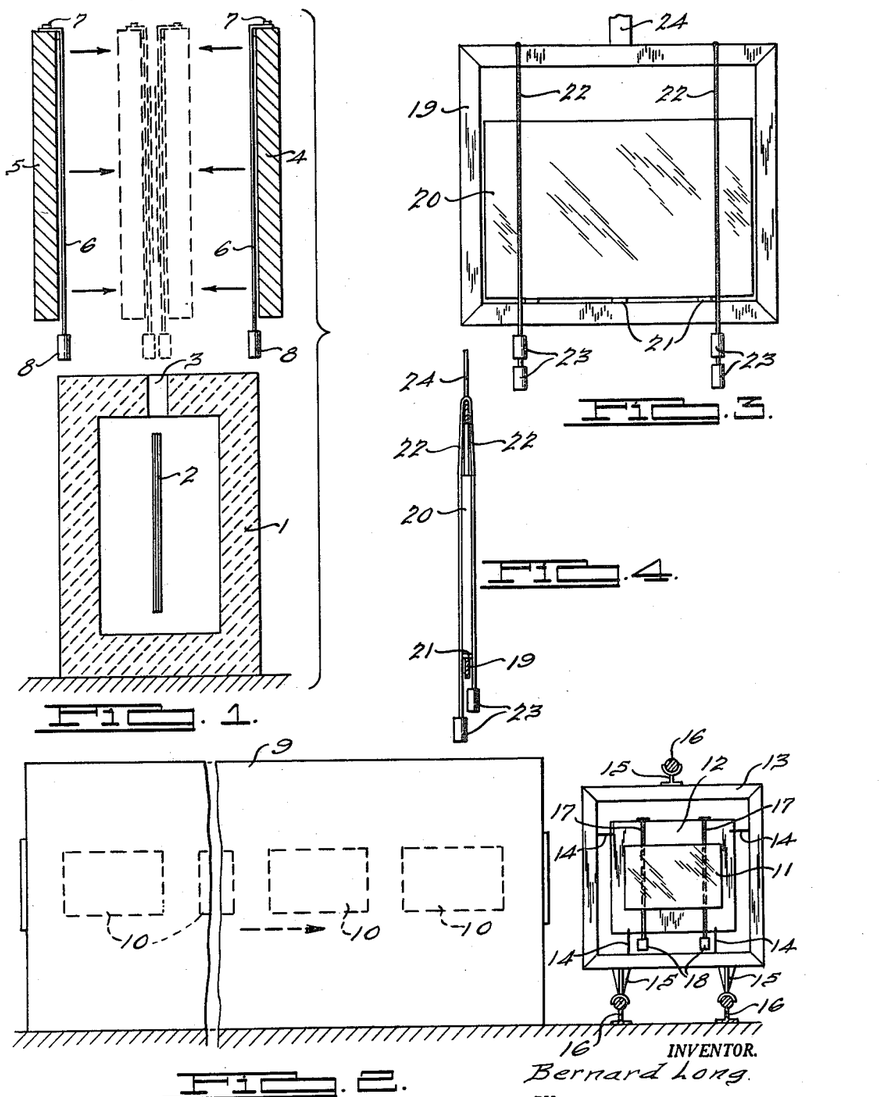
FIGURE 1 is a schematic view of a heating furnace and associated cooling plates for practice of the present invention.
FIG. 2 is an alternative form of continuous furnace illustrating an alternative method of mounting and handling the glass sheet.
FIG. 3 illustrates one form of frame for supporting the heated glass sheet.
FIG. 4 is a cross-sectional view of the supporting frame shown in FIG. 3.

In FIG. 1, of the drawings, a furnace and associated cooling plates are schematically shown. The furnace 1 is of conventional construction and has mounted therein, a glass sheet 2 to be heat treated. This furnace has an opening 3 at the top through which the vertically arranged glass sheet 2 may be raised in vertical position and disposed between cooling plates 4 and 5. These cooling plates 4 and 5 carry in contact with their faces, a pair of metal wires 6 fastened to the upper edges of the plates by pins 7. These wires are maintained in tension by means of weights 8 attached to their lower ends and serving to stretch them uniformly over the surfaces of the cooling plates 4 and 5. These wires are preferably formed of nonoxidizing material, such, for example, as stainless steel and are of a diameter pre-selected to maintain the desired spaced relationship between the surfaces of the cooling plates and the heated glass sheet which as described above, is preferably 3/10 of a millimeter or less. While not shown in FIGURE 1, the glass sheet may be supported in the furnace in several different ways, some of which are hereinafter described in detail, it being essential that the method of supporting the glass sheet be such that both surfaces are free from any obstructions which might prevent the surfaces of the cooling plates from being brought into the desired proximity to the surface of the heated glass sheet.

In FIGURE 2, a continuous furnace is diagrammatically illustrated. This furnace 9, as is conventional in the art, is provided interiorly with means to continuously move the vertically arranged glass sheets 10 horizontally therethrough. A glass sheet 11 is shown in tempering position as it is mounted between the cooling plates. Only one cooling plate 12 is illustrated in this view to facilitate the showing. The cooling plate 12 is vertically supported in a frame 13 by means of support elements 14. The frame 13 may have brackets 15 extending from top and bottom thereof which are adapted to engage and slide upon transversely extending rails or ways 16 to provide means for easily and smoothly moving the cooling plate 12 toward and away from the heated glass sheet 11. Anchored to the upper edge of the cooling plate 12 are a pair of spacing wires 17 maintained in tension across the face of the cooling plate 12 by means of weights 18.

It will be understood that in the view shown in FIGURE 2 of the drawings, the apparatus contemplates the use of a second frame and cooling plate assembly adapted to approach the opposite side of the glass sheet to be cooled. This second frame and cooling plate assembly is adapted to slide along the same rails 16 as the first cooling plate described above and is substantially identical thereto in all material respects. The view shown in FIGURE 2 shows the apparatus with this second frame assembly removed to facilitate the illustration of the construction and arrangement of parts.

FIGURES 3, 4, 5, 6 and 7 illustrate various alternative means for supporting the heated glass sheet in order that it may be properly held while being subjected to the action of the cooling plates almost entirely irrespective of the construction, arrangement and mounting of the cooling plates used.

It will be noted that all of these forms of apparatus for mounting the heated glass sheet serve to support the sheet in a position such that both of its opposite faces are entirely exposed and are free from any obstructions which might serve to prevent the cooling plates from being brought into the desired proximity to the entire surface area of both sides of the heated glass sheet.

In the construction shown in FIGURE 3, the sheet to be tempered is supported inside a rectangular frame 19, preferably formed of nonoxidizable steel or other suitable material. As will be seen by reference to the cross-sectional view, FIGURE 4, this frame 19 has a thickness less than the thickness of the glass sheet 20 supported therein. The sheet 20 is supported at its lower edge by means of spacer elements 21 secured to the upper edge of the bottom transverse element of the rectangular frame 19.

The glass sheet 20, is retained in predetermined desired position in the frame 19 by means of wires 22 that straddle the upper transverse element of the frame 19. Each end of each of the wires 22 is connected to a suitable tensioning weight 23. These weights 23 are sufficient not only to maintain proper tension on the wires 22 but to maintain the glass sheet in predetermined desired position within the frame 19. It will be appreciated that these wires 22 may perform a dual function. They primarily serve to maintain the glass sheet in proper position within the frame and may also serve to space the surfaces of the cooling plates from the surfaces of the glass sheet during the tempering operation.

The entire frame assembly may be supported, moved and manipulated by means of an upwardly extending element 24.

Figure 5:
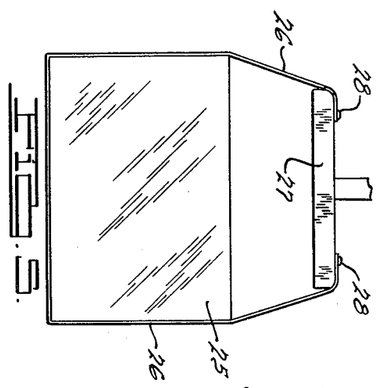
FIG. 5 illustrates still another alternative form of supporting means for the glass sheet.

In the construction shown in FIGURE 5, the sheet to be tempered 25, is supported by means of a strip of nickel steel 26 of a width slightly less than the thickness of the glass sheet 25. The upper ends of the strip 26 are anchored to a transversely extending bar 27 at the points 28. It is obviously desirable that the length of the bar 27 be materially less than the transverse width of the glass sheet which it serves to support in order that the strip 26 will snugly engage and support three sides of the sheet mounted therein. When a construction of this type is used, it is obvious that such spacing elements as are used to control the proximity of the cooling plates must be mounted on or associated with the cooling plates.

Figure 6:
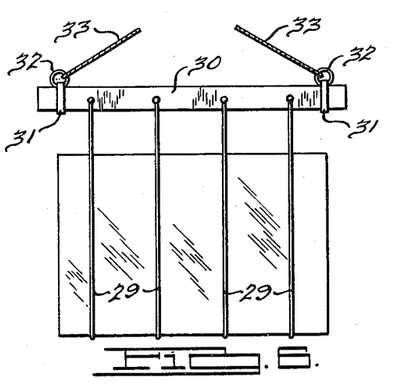
FIG. 6 illustrates a further alternative form of sheet suspension.
Figure 7:
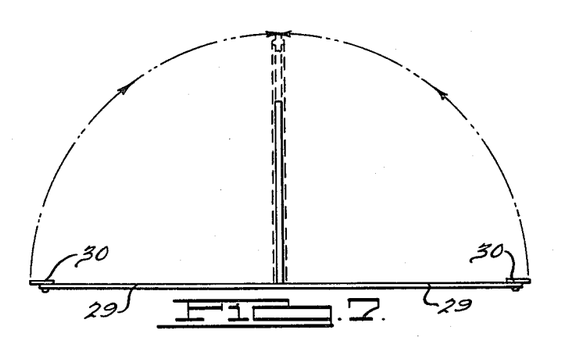
FIG. 7 is an end view illustrating the manner in which the sheet suspension shown in FIG. 5 is formed.

In the construction shown in FIGURES 6 and 7, it will be seen that the glass sheet to be tempered is supported by a plurality of loops of calibrated wire 29. The ends of these wire loops are each attached to one of a pair of transverse bars 30. The lower edge of the glass sheet to be treated is placed at about the mid-point of the wires 29. The two bars 30 are then fastened together by means of links 31, which have rings 32 at their upper ends. Cables 33 secured to the rings 32 may serve to provide means for supporting and manipulating the entire assembly.

Figure 8:
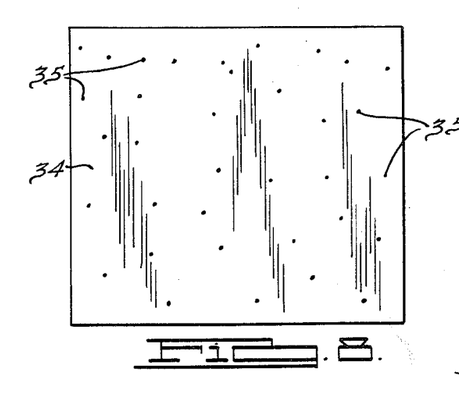
FIG. 8 is a plan view of a cooling plate having spacing elements on the face thereof.
Figure 9:
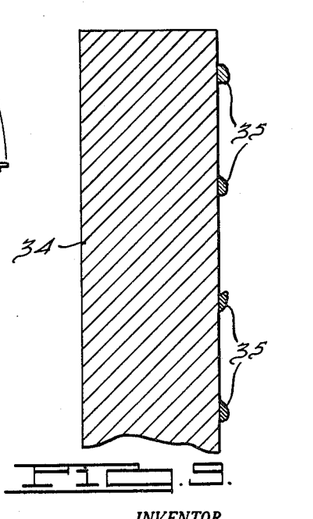
FIG. 9 is an enlarged fragmentary cross-sectional view illustrating the manner in which spacing granules may be mounted on the surface of the cooling plate.

In FIGURES 8 and 9, is shown the cooling plate 34 having spacing granules 35 adhesively secured to the face thereof. The granules are of calibrated size and uniform diameter and may be formed of calcium carbonate, or other material having the suitable desirable characteristics. These granules may be bonded to the face of the cooling plate in any suitable manner and distributed at random throughout the surface thereof. One way of achieving this result is to mix the calibrated granules in suspension in an aqueous solution of sodium silicate where the granules remain in suspension. This liquid is then sprayed on the surface of the cooling plate and a suitable number of granules will become bonded thereto.

In the subsequent figures of the drawings a somewhat modified form of tempering apparatus and process is shown and described. The apparatus and process hereinafter described differs from that described above primarily in that the cooling plates themselves serve to hold, through the spacing elements, the glass sheet being tempered rather than having it held in one or more of the types of supporting frames described above.

In these modifications of the invention, it is contemplated that a pair of separately movable cooling plates will be employed to engage and cool each face of the glass sheet, and as will be seen, these constructions permit the handling and manipulation of the glass sheet by more or less conventional handling means.

Figure 10:
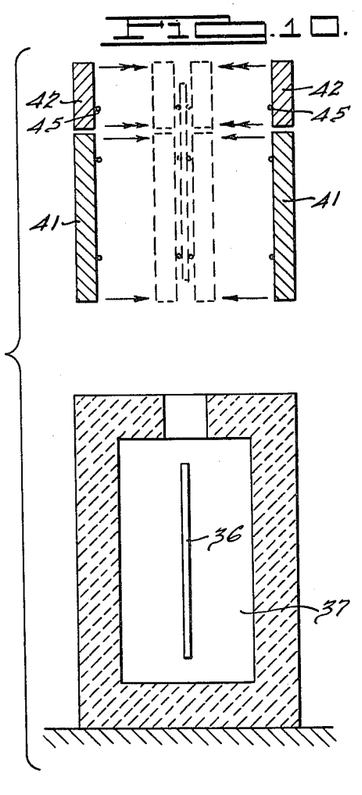
FIG. 10 illustrates a further modification of the present invention wherein a pair of cooling plates are employed for each of the surfaces of the glass sheet to be cooled.

As is schematically illustrated in FIGURE 10, a glass sheet to be tempered 36 is supported and heated in a funace 37. As seen in FIGURES 13, 14, 15 and 16, the glass sheet, when heated to the predetermined desired condition, may be vertically removed from the furnace by means of conventional glass handling tongs 38, suspended by a pair of links 39 and 40.

Figure 13:
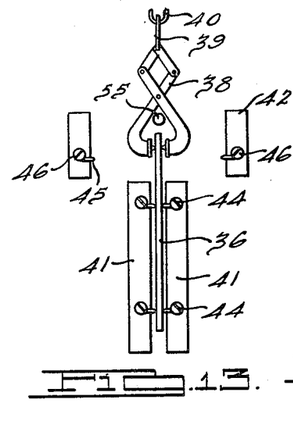
FIGS. 13, 14 and 15 are schematic views illustrating the manner in which the heated glass sheet is manipulated and supported between the cooling plates.
Figure 14:
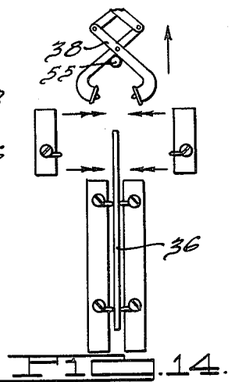
Figure 15:
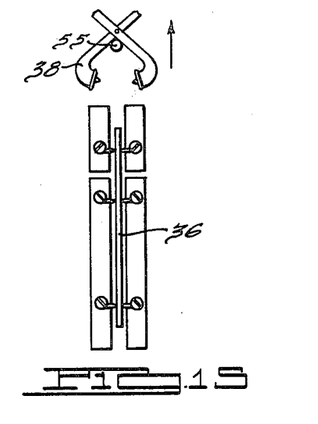
Figure 16:
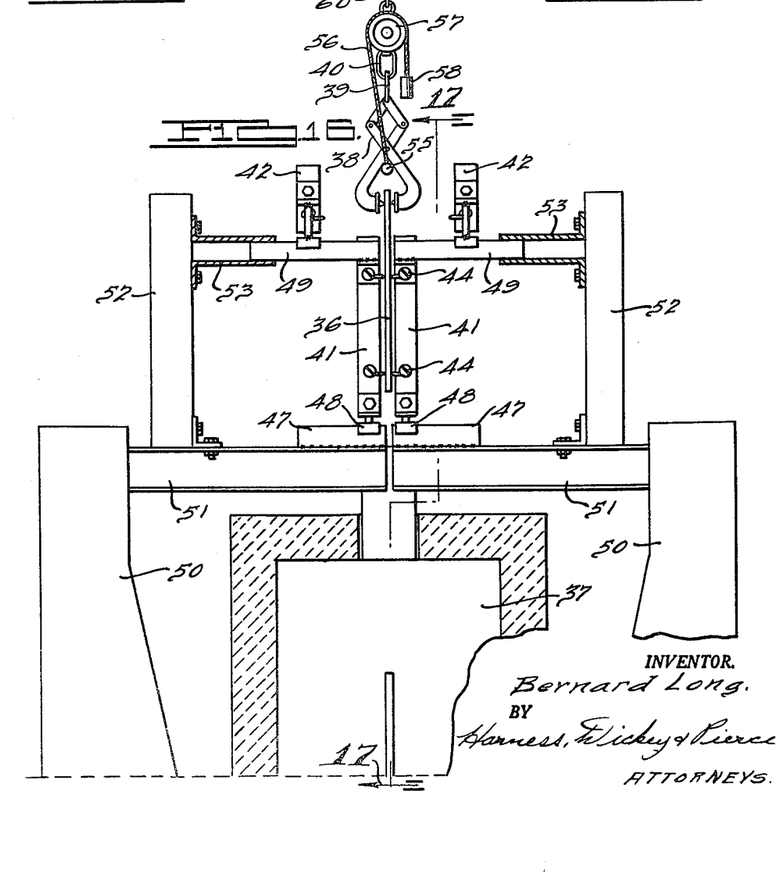
FIG. 16 is an elevational view of apparatus for mounting and moving the cooling plates and handling the heated glass sheet.

FIGURES 13, 14 and 15 show schematically three successive phases of the tempering apparatus and process and FIGURE 16 shows the same phase of the process shown in FIGURE 13, but in a somewhat less schematic fashion. In this form of the invention, each face of the glass sheet is engaged by a pair of cooling plates 41 and 42, which together have a surface area at least coextensive with and as great as the face of the glass sheet.

Figure 12:
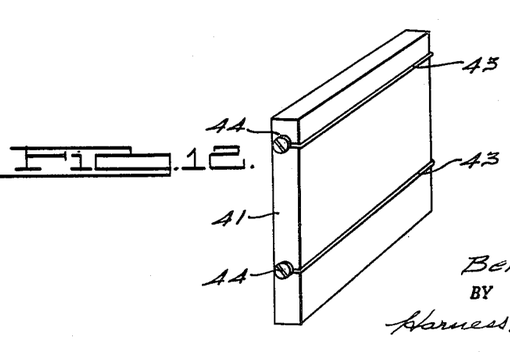
FIG. 12 is an enlarged fragmentary view of a section of a cooling plate having spacing wires against the face thereof.

FIGURE 12 shows in perspective, one of the cooling plates 41 and it will be seen that this cooling plate has at least a pair of calibrated spacing wires 43 tightly stretched across the face thereof. These spacing wires may have their ends anchored to suitable screws 44 engaged in the vertical edges of the cooling plate. Similarly the cooling plates 42 may have at least one tightly stretched spacing wire 45 across the face thereof anchored by means of screws 46.

Figure 17:
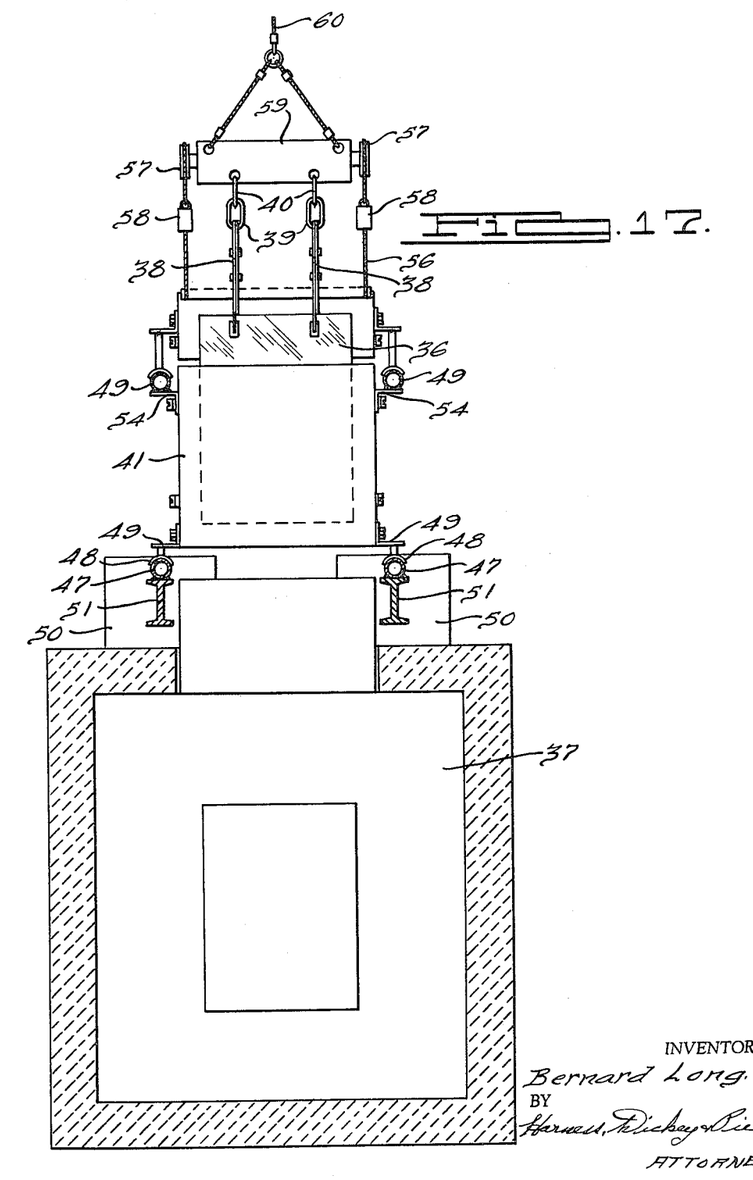
FIG. 17 is a sectional view taken on the line 17—17 of FIG. 16, further illustrating the apparatus.

As is best seen in FIGURES 16 and 17, the lower cooling plates 41 are mounted for movement on ways or rails 47 which are engaged by sliding shoes 48 mounted on and carried by suitable brackets 49 secured to the lower corners of the lower cooling plate 41.

A pair of horizontally disposed upper rails 49 which as hereinafter described provide means for slideably supporting the upper cooling plates 42 and also provide means for guiding the movement of the upper portions of the lower cooling plates 41.

The means for mounting and supporting the above-described apparatus may comprise a foundation 50 serving to mount and support transversely extending beams 51 on which the rails 47 are mounted. The transversely extending beams serve to support vertically extending uprights 52 which in turn provide means for supporting the upper rails. The upper rails 49 are supported in horizontally extending brackets 53 bolted thereto.

The lower cooling plates have brackets 54 bolted thereto which serve to engage the under side of the upper rails 49, and aid in supporting and guiding these cooling plates during movement thereof.

Each of the four cooling plates making up the assembly is provided with suitable means, preferably power operated (not shown) for moving the plate toward and away from the surface of the glass sheet which it is adapted to engage and cool.

In operation of the apparatus above described the glass sheet is heated in the furnace 37 to the predetermined softened condition and then is vertically lifted therefrom by means of the two pairs of tongs 38. The sheet is elevated to a position substantially as shown in FIGURES 13, 14 and 15. The lower pair of cooling plates are then simultaneously moved toward the heated glass sheet until the spacing wires 43 engage the surface of the heated glass sheet. At this point, the heated glass sheet is gripped between and supported by the lower cooling plates 41.

A transversely extending separator bar 55 extends between the lower jaws of the tongs 38. This separator bar 55 is constantly urged upwardly by means of a pair of cables 56 which run over idler pulleys 57 and have their ends fastened to counterweights 58. The tongs are supported by a transversely extending bar 59 which in turn is hung from a cable 60 by means of which the tong assembly can conveniently be raised and lowered.

It will be seen that when the heated glass sheet has been gripped between the lower cooling plates 41, tension on the cable 60 can be slackened slightly. The weights 58 will cause upward movement of the separator bar 55 thereby causing disengagement of the tongs from the heated glass sheet. The tongs then may be raised up out of the way by the cable 60. The upper cooling plates are then simultaneously moved into close proximity to the surface of the glass sheet. They are spaced therefrom only by the thickness (diameter) of the spacing wire 45.

In order to obtain the best possible results when tempering a heated glass sheet in accordance with the apparatus and method above-described it is important that the mounting of the upper and lower cooling plates on each side of the sheet be such that the space between the surface of the lower plates and the adjacent surface of the upper plate is very small. In practice it has been found desirable to space these adjacent surfaces of the cooling plates less than 0.04 inch.

Another aspect of this process which should be emphasized is that it is desirable to reduce as much as possible the time interval which must elapse between the time the lower plates are brought into proximity to the surface of heated glass sheet and the subsequent time when the upper cooling plates are moved into similar position. This means that in order to obtain the best possible results the tongs should be disengaged as promptly as possible, and the upper cooling plates moved into operative position as soon thereafter as is practicable.

Figure 11:
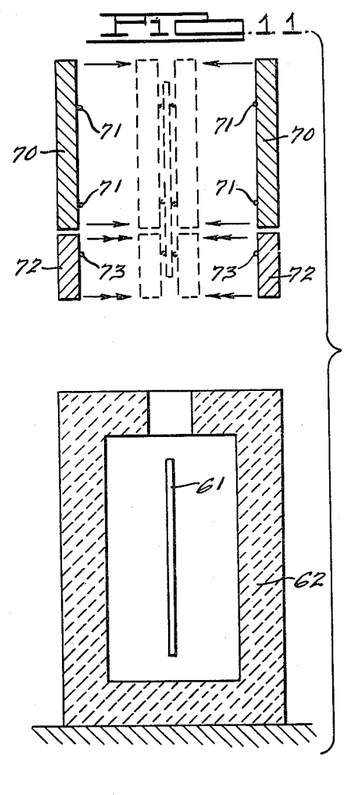
FIG. 11 represents a modification of the construction shown in FIG. 10.
Figure 18:
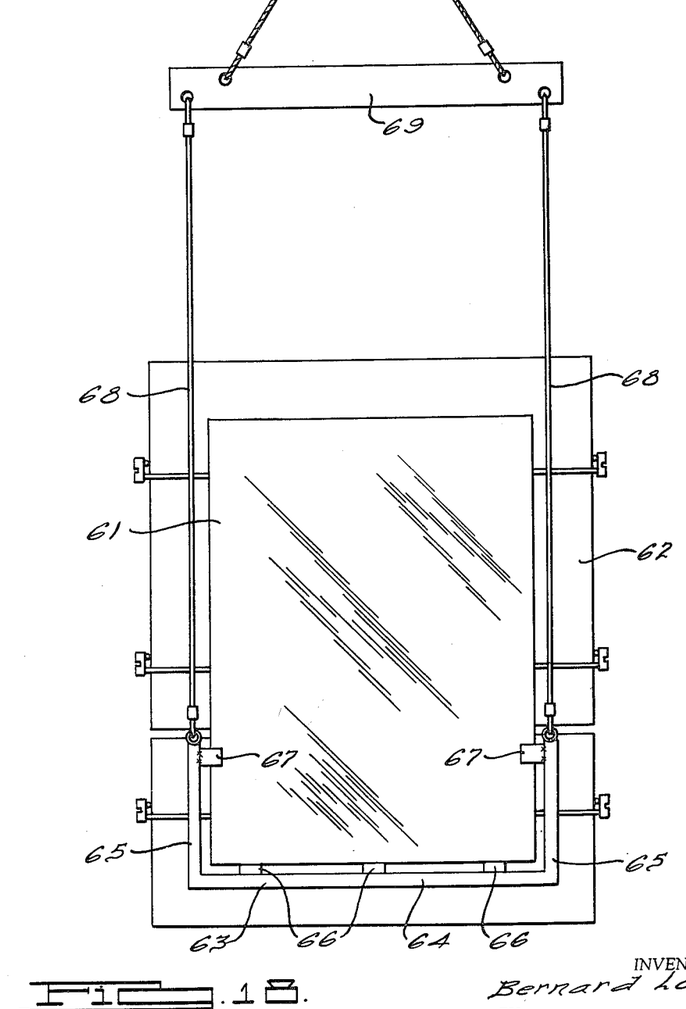
FIG. 18 illustrates still another alternative form of sheet supporting apparatus.

In FIGURES 11 and 18 a slightly modified form of the above described apparatus is shown. In this modification, the mounting and movement of the cooling plates is much the same as that described above and consequently is not shown or described in detail in connection with this modification.

In this form of the invention, a different form of sheet supporting apparatus is used and the initial gripping of the heated sheet is accomplished by the upper cooling plates rather than by the lower cooling plates as has been described above.

The glass sheet to be tempered 31 is suspended in the furnace 62 by means of a U-shaped frame 63 having a transversely extending base member 64 and short upwardly extending side portions 65.

The lower marginal edge of the glass sheet 61 is supported in the frame by insulating tablets 66 on the upper surface of the member 64. The sheet is retained in vertical position by means of forked elements 67 which are mounted on and project inwardly from the upstanding members 65 of the frame.

The frame 63 is supported by a pair of rods 68 which depend from a cross member 69 which in turn is suspended from a main elevating cable (not shown) for raising and lowering the sheet supporting frame 63. The rods 68 are of a diameter less than the thickness of the glass sheet so that they will not interfere with movement of the upper cooling plates into close proximity to the surface of the sheet to be tempered.

Referring now to FIGURE 11, it will be seen that the cooling plates comprise an upper pair 70 of the same general construction as the cooling plates 41 heretofore described and these plates have spacing wires 71 across their faces. The lower cooling plates 72 are similar in construction and mounting to the cooling plates 42 and have at least one spacing wire 73 across the faces thereof.

In operation, the glass sheet heated to the predetermined degree of softness is raised from the furnace to a position between the cooling plates. The upper pair of cooling plates 70 is then moved into close proximity to the heated glass sheet with the spacing wires thereof in engagement with the glass sheet whereby said sheet is gripped between said plates. Since the rods 68 are of less diameter than the thickness of the glass sheet to be tempered there is nothing to interfere with the movement of the parts into the desired relationship.

What is claimed is:

1. The method of uniformly heat treating flat glass sheets which comprises: heating a flat glass sheet to a predetermined degree of softness; supporting the heated glass sheet in a substantially vertical position between a pair of heat absorbing cooling plates each having a single surface facing the glass sheet which is flat throughout the entire area thereof which is coextensive with the glass sheet; providing a plurality of spacing elements each having a thickness not greater than 1.00 mm. between the glass sheet and each of the cooling plates; simultaneously moving each of the cooling plates toward the glass sheet until the spacing elements are clamped between the glass sheet and said flat surfaces on the cooling plates, the spacing elements being of sufficient number and so positioned that when so clamped every point on each of said flat surfaces is spaced from the glass sheet an equal distance not greater than 1.00 mm., and yet few enough in number that the spacing elements themselves do not contribute materially to the cooling action of the cooling plates; maintaining the cooling plates in said position to cool and thereby uniformly temper the glass sheet; and thereafter withdrawing the cooling plates from said position.

2. The method of uniformly heat treating flat glass sheets which comprises: heating a flat glass sheet to a predetermined degree of softness; supporting the heated glass sheet in a substantially vertical position between a pair of heat absorbing cooling plates each having a single surface facing the glass sheet which is flat throughout the entire area thereof which is coextensive with the glass sheet; providing a plurality of spacing elements each having a thickness not greater than 1.00 mm. between the glass sheet and each of the cooling plates; simultaneously moving each of the cooling plates toward the glass sheet until the spacing elements are clamped between the glass sheet and said flat surfaces on the cooling plates, the spacing elements being of sufficient number and so positioned that when so clamped every point on each of said flat surfaces is spaced from the glass sheet an equal distance not greater than 1.00 mm., and yet few enough in number that the spacing elements themselves do not contribute materially to the cooling action of the cooling plates; supporting the glass sheet by the clamping action of the cooling plates acting through the spacing elements; maintaining the cooling plates in said position to cool and thereby uniformly temper the glass sheet; and thereafter withdrawing the cooling plates from said position.

3. The method of uniformly heat treating flat glass sheets which comprises: heating a flat glass sheet to a predetermined degree of softness; supporting by support means the heated glass sheet in a substantially vertical position between upper and lower pairs of heat absorbing cooling plates each having a single surface facing the glass sheet which is flat throughout the entire area thereof which is coextensive with the glass sheet; providing a plurality of spacing elements each having a thickness not greater than 1.00 mm. between the glass sheet and each of the cooling plates; simultaneously moving one of the pairs of cooling plates toward the glass sheet until the spacing elements are clamped between the glass sheet and said flat surfaces on said one pair of cooling plates to support the glass sheet; releasing said support means; simultaneously moving the other pair of cooling plates toward the glass sheet until the spacing elements are clamped between the glass sheet and said flat surfaces on said other pair of cooling plates, the spacing elements clamped by both pairs of cooling plates being of sufficient number and so positioned that every point on each of the flat surfaces on both pairs of cooling plates is spaced from the glass sheet an equal distance not greater than 1.00 mm., and yet few enough in number that the spacing elements themselves do not contribute materially to the cooling action of the cooling plates, both pairs of cooling plates being positioned closely adjacent one another to cover substantially the entire area of each of the surfaces of the glass sheet; maintaining the cooling plates in said position to cool and thereby uniformly temper the glass sheet; and thereafter withdrawing the cooling plates from said position.

4. Apparatus for uniformly tempering heated flat glass sheets, comprising: means for supporting a heated flat glass sheet in a substantially vertical position with the opposite faces thereof completely exposed and free from obstructions; a heat absorbing cooling plate disposed on each side of the glass sheet, each of said cooling plates having a single surface facing the glass sheet, said surface being flat throughout the entire area thereof which is coextensive with the glass sheet; a plurality of spacing wires disposed between the glass sheet and each of said surfaces, each of said spacing wires having a diameter not greater than 1.00 mm.; and means for simultaneously moving each of said cooling plates toward the glass sheet to clamp said spacing wires between said surfaces and the glass sheet, said spacing wires being positioned so that when so clamped every point on each of said flat surfaces is spaced from the glass sheet an equal distance not greater than 1.00 mm.

5. Apparatus as claimed in claim 4, wherein said spacing wires are secured to said cooling plates.

6. Apparatus as claimed in claim 4, wherein said spacing wires are secured to said glass supporting means.

7. Apparatus as claimed in claim 4, wherein said spacing wires are metal wires.

8. Apparatus for uniformly tempering heated flat glass sheets, comprising: means for supporting a heated flat glass sheet in a substantially vertical position with the opposite faces thereof completely exposed and free from obstructions; a heat absorbing cooling plate disposed on each side of the glass sheet, each of said cooling plates having a single surface facing the glass sheet, said surface being flat throughout the entire area thereof which is coextensive with the glass sheet; a plurality of spacing granules secured to each of said surfaces on said cooling plates, each of said spacing granules having a dimension perpendicular to the surface to which it is secured not greater than 1.00 mm.; and means for simultaneously moving each of said cooling plates toward the glass sheet to clamp said spacing granules between said surfaces and the glass sheet, said spacing granules being positioned so that when so clamped every point on each of said flat surfaces is spaced from the glass sheet an equal distance not greater than 1.00 mm.

9. Apparatus for uniformly tempering heated flat glass sheets, comprising: means for supporting a heated flat glass sheet in a substantially vertical position with the opposite faces thereof completely exposed and free from obstructions; an upper pair of heat absorbing cooling plates disposed on each side of the glass sheet; a lower pair of heat absorbing cooling plates disposed on each side of the glass sheet, said upper and lower pairs of cooling plates being disposed closely adjacent one another, each of said cooling plates having a single surface facing the glass sheet, each of said surfaces being flat throughout the entire area thereof which is coextensive with the glass sheet and all of said surfaces being of sufficient size to cover both faces of the glass sheet; a plurality of spacing elements disposed between the glass sheet and each of said surfaces, each of said spacing elements having a thickness not greater than 1.00 mm.; means for simultaneously moving one of said pairs of cooling plates toward the glass sheet to clamp said spacing elements between said surfaces on said pair of cooling plates and the glass sheet; and means for independently moving the other pair of said cooling plates simultaneously toward the glass sheet to clamp said spacing elements between said surfaces of said other pair of cooling plates and the glass sheet, said spacing elements being of sufficient number and so positioned that when so clamped by both pairs of cooling plates every point on each of said flat surfaces is spaced from the glass sheet an equal distance not greater than 1.00 mm., and yet few enough in number that the spacing elements themselves do not contribute materially to the cooling action of the cooling plates.

References Cited by the Examiner
UNITED STATES PATENTS

| | | | |
|---|---|---|---|
| 1,895,548 | 1/33 | Lebel | 65—115 |
| 1,900,583 | 3/33 | Owen | 65—344 |
| 1,951,950 | 3/34 | Rising | 65—114 |
| 1,981,560 | 11/34 | Littleton | 65—115 |
| 2,213,014 | 8/40 | Owen | 65—348 |
| 2,247,289 | 6/41 | Despret | 65—114 |
| 2,251,106 | 7/41 | Black et al. | 65—349 X |
| APC405,411 | 6/43 | Schroder | 65—348 |
| 2,359,222 | 9/44 | Kiehl et al. | 65—348 |
| 2,365,967 | 12/44 | Long | 65—115 |
| 2,553,945 | 5/51 | Schroder | 65—349 |

FOREIGN PATENTS

| | | |
|---|---|---|
| 333,840 | 8/30 | Great Britain. |
| 442,633 | 2/36 | Great Britain. |
| 728,491 | 11/42 | Germany. |
| 734,153 | 4/43 | Germany. |

DONALL H. SYLVESTER, *Primary Examiner.*

UNITED STATES PATENT OFFICE
CERTIFICATE OF CORRECTION

Patent No. 3,174,839                                            March 23, 1965

Bernard Long

It is hereby certified that error appears in the above numbered patent requiring correction and that the said Letters Patent should read as corrected below.

Column 1, line 64, for "partilly" read -- partially --; line 65, for "imperfection" read -- imperfections --; column 2, line 20, after "glass" insert -- sheet --; line 26, for "exeremely" read -- extremely --; line 30, for "plates" read -- platens --; column 4, line 74, for "apprach" read -- approach --.

Signed and sealed this 24th day of August 1965.

(SEAL)
Attest:

ERNEST W. SWIDER                                         EDWARD J. BRENNER
Attesting Officer                                            Commissioner of Patents